United States Patent
Togashi

Patent Number: 5,930,137
Date of Patent: *Jul. 27, 1999

[54] WORK SUPPLYING METHOD AND APPARATUS TO BATCH PROCESS APPARATUS FOR SEMICONDUCTOR WAFER WITH PREFERENTIAL TREATMENT TO TIME CRITICAL LOTS

[75] Inventor: Yoichi Togashi, Yamagata, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/752,305

[22] Filed: Nov. 19, 1996

[30] Foreign Application Priority Data

Nov. 24, 1995 [JP] Japan ................................ 7-305357

[51] Int. Cl.$^6$ ....................................... G06F 19/00
[52] U.S. Cl. ........................ 364/468.06; 364/468.07; 364/468.08; 364/468.28
[58] Field of Search ................. 364/468.01–468.28; 29/592

[56] References Cited

U.S. PATENT DOCUMENTS

| | | | |
|---|---|---|---|
| 5,148,370 | 9/1992 | Litt et al. | 364/468.1 |
| 5,282,139 | 1/1994 | Kobayashi | 364/468 |
| 5,351,195 | 9/1994 | Sherman | 364/468.06 |
| 5,359,524 | 10/1994 | Rohan | 364/468.05 |
| 5,465,534 | 11/1995 | Hirosawa et al. | 52/126.6 |
| 5,696,689 | 12/1997 | Okumura | 364/468.28 |
| 5,737,228 | 4/1998 | Ishizuka et al. | 364/468.08 |
| 5,745,364 | 4/1998 | Togasui | 364/468.28 |

FOREIGN PATENT DOCUMENTS

| | | |
|---|---|---|
| 0 437 634 | 7/1991 | European Pat. Off. . |
| 3-236213 | 10/1991 | Japan . |
| 04318122 | 9/1992 | Japan . |

*Primary Examiner*—James P. Trammell
*Assistant Examiner*—Demetra R. Smith
*Attorney, Agent, or Firm*—Foley & Lardner

[57] ABSTRACT

The invention provides a work supply method and apparatus for a batch process apparatus for semiconductor wafers by which works having a comparatively severe delivery date are processed preferentially. A processing end time calculation section of a batch formation control section refers to a history file in response to a processing start report from a batch process apparatus to predict a processing end time. A work extraction section refers to a step management file to extract those of the works which can arrive at a batch process apparatus on or prior to the thus predicted processing end time. A batch formation section forms, designating the extracted works as an object of batch formation, the works into a batch such that one of the works which has the highest preferential degree is designated as a top work of the batch. A transport section transports the works of the batch collectively to the batch process apparatus.

4 Claims, 4 Drawing Sheets

WORK SUPPLYING METHOD AND APPARATUS TO BATCH PROCESS APPARATUS FOR SEMICONDUCTOR WAFER WITH PREFERENTIAL TREATMENT TO TIME CRITICAL LOTS

BACKGROUND OF THE INVENTION

1. Field of the Invention

This invention relates generally to a diffusion apparatus, a chemical vapor deposition (CVD) apparatus or a like apparatus for processing a semiconductor wafer, and more particularly to a supplying method and a supplying apparatus wherein works are supplied in a batch to a batch process apparatus so as to be processed in a batch by the batch process apparatus.

2. Description of the Related Art

In a semiconductor wafer process, an operation of forming works such as wafers into a batch is conventionally performed by an operator. In particular, from within a plurality of works transported to the batch process apparatus, those of the works for which processing conditions are the same are selected by the operator, and a predetermined number of such works are put in order and formed into a batch and then supplied to the batch process apparatus by the operator. The conventional work supplying method just described has such problems as described below. In particular, since selection of works to be formed into a batch is performed based on a determination by an operator in this manner, there is the possibility that the wrong determination may be made, and in this instance, unacceptable goods processed by a process different from a required process are produced. Further, the operator has a heavy responsibility in that the operator must form works into a batch after a preferential order of the works is recognized. The presence of the operator presents an undesirable labor intensive impediment. In addition, as the size of wafers to be handled increases, the number of works which can be prepared for a production line decreases, and as a result, the batch process apparatus fails in formation of a batch from a predetermined number of works. Even if the operation rate of the apparatus achieves the desired rate, a desired processing quantity cannot be achieved, and the stacking quantity decreases.

In order to eliminate the problems of the conventional work supplying method described above, a batch supplying method which exhibits an improved batch efficiency and allows automation of operation has been proposed in Japanese Patent Laid-Open Application No. Heisei 3-236213.

In particular, according to the batch supplying method disclosed in the document mentioned above, a formation number of works to be formed into a batch is decided and feeding situations, processing conditions, processing times and a preferential order for processing of different works are determined in advance. Those works which have the same processing conditions are arranged in a descending order of the preferential degree. Then, if the number of works equal to the formation number are on hand, they are formed as they are into a batch to be supplied. Otherwise if the number of works equal to the formation number is not on hand, then it is determined based on arrival times, processing times and a preferential order of works predicted depending upon the feeding situations whether or not one should be waited for all of the works to arrive to form one batch. Based on a result of this determination, a batch to be supplied to the batch process apparatus is formed from works of a number either equal to or smaller than the formation number.

The conventional batch supplying method described above, however, has problems as described below.

In particular, the first problem resides in that it sometimes occurs that those works whose delivery date is critical, that is, those works which have a comparatively higher preferential degree or degrees, are processed not preferentially but after processing of other works, resulting in failure in delivery of products on or prior to the delivery date.

The reason is that, when the number of works equal to the predetermined formation number are already prepared for the batch process apparatus, the works of the higher preferential degree are left without being supplied till the next timing for formation of a batch. This is because a batch is formed only from the works currently prepared for the batch process apparatus, even if works having a higher preferential degree or degrees than the works prepared in the batch are prepared for the batch process apparatus before the prepared works are actually processed by the batch process apparatus.

The second problem to be solved regarding the conventional batch supplying method described above resides in that, if works formed into a batch are processed as they are by the batch process apparatus, then there is the possibility that unacceptable products may be produced from the works.

The reason is that, although, when a number of works equal to the formation number are not on hand, an arrival time of a work is predicted and it is determined whether or not formation of a batch should waite till such arrival time. If the formation should waite till the arrival time, such determination is made without taking into consideration whether or not a time limitation between different steps is present, and if the presence of such time limitation is not taken into consideration, then unacceptable products may possibly be produced.

SUMMARY OF THE INVENTION

It is an object of the present invention to provide a work supplying method and apparatus for a batch process apparatus for semiconductor wafers by which works having a comparatively severe delivery date are processed preferentially.

It is another object of the present invention to provide a work supplying method and apparatus for a batch process apparatus for semiconductor wafers by which processing in different steps is performed within a limited allowable time determined therefor.

In order to attain the objects described above, according to an aspect of the present invention, there is provided a work supplying method to a batch process apparatus for semiconductor wafers for forming a plurality of works prepared for processing by the batch process apparatus and a pre-batch process apparatus into a batch and supplying the works of the batch collectively to the batch process apparatus. The method comprises the steps of predicting a processing end time in response to a processing start report from the batch process apparatus, designating those of the works which satisfy a condition that the works can arrive at the batch process apparatus on or prior to the predicted processing end time and can be processed by the batch process apparatus as an object of batch formation, forming the designated works into a batch such that the one work must be processed first among the works is positioned at the top of the batch, and supplying all of the works formed into a batch to the batch process apparatus simultaneously when the current cycle of the batch process apparatus comes to an end.

Preferably, the prediction of a processing end time is performed by referring to a file in which past results (processing end times determined taking processing times and preparation times in the pre-batch processing step of the individual works, transportation times to the batch process time and so forth into consideration) are stored.

Preferably, after the designated works are formed into a batch temporarily, a maximum allowable time required for processing of the batch is confirmed, and if a sufficient time is available, then those of the works which can arrive at the batch process apparatus within the time are added as the object of batch formation and a new batch is formed using also the added works.

Preferably, the work supplying method to a batch process apparatus for semiconductor wafers is constructed such that, if there is a time limitation to a time interval after a time at which processing of works by the pre-batch process apparatus comes to an end till another time at which processing of the works by the batch process apparatus is started, a transport device and the pre-batch process apparatus are controlled so that processing by the pre-batch process apparatus is started for works prepared for the pre-batch process apparatus in response to a request from the batch process apparatus.

According to another aspect of the present invention, there is provided a work supplying apparatus to a batch process apparatus for semiconductor wafers for forming a plurality of works prepared for processing by the batch process apparatus and a pre-batch process apparatus into a batch and supplying the works of the batch collectively to the batch process apparatus. The apparatus comprises a processing end time calculation device for referring to a history file in response to a processing start report from the batch process apparatus to predict a processing end time, a work extraction device for referring to a step management file to extract those of the works which can arrive at the batch process apparatus on or prior to the processing end time predicted by the processing end time calculation device, a batch formation device, designating the works extracted by the work extraction device as an object of batch formation, for forming the works into a batch such that one of the works which has the highest preferential degree is designated as a top work of the batch, and a transport device for transporting the works formed into a batch by the batch formation device collectively to the batch process apparatus.

Preferably, the work supplying apparatus for a batch process apparatus for semiconductor wafers further comprises a progress situation supervision device for supervising a progress situation, the batch formation device first forming a temporarily batch and then accessing the progress situation supervision device for a maximum allowable time required for processing of the batch. If a sufficient time is available, the batch formation device adds those of the works which can arrive at the batch process apparatus within the time as the object of batch formation and forms a new batch using also the added works.

In the conventional batch supplying method described hereinabove, if a number of works equal to a predetermined batch formation number are prepared for a batch process apparatus, then a batch is formed only from those works prepared for the batch process apparatus and is processed by the batch process apparatus. However, in the work supplying method and apparatus of the present invention, irrespective of whether a number of works equal to a predetermined batch formation number are prepared for the batch process apparatus, those works prepared for the batch process apparatus and for other preceding steps which can arrive at the batch process apparatus on or prior to a processing end time of the batch process apparatus are all designated as an object of batch formation. Accordingly, with the work supplying method and apparatus of the present invention, one can avoid the disadvantage that processing for works which have a comparatively critical delivery date is performed after processing for other works whose delivery date is not critical.

Further, the conventional batch supplying method described above is not adapted to eliminate time intervals between different steps. However, with the work supplying method of the present invention, if there is a time interval after a time at which processing of works by the pre-batch process apparatus comes to an end until another time at which processing of the works by the batch process apparatus is started, the transport device and the pre-batch process apparatus are controlled so that processing by the pre-batch process apparatus is started for works prepared for the pre-batch process apparatus in response to a request from the batch process apparatus. Thus, the pre-batch process apparatus does not perform its processing in isolation, but performs its processing in cooperation with the batch process time. Consequently, the allowable limitation time can be strictly observed. For example, where the batch process apparatus performs a diffusion processing for a semiconductor wafer and the pre-batch process apparatus performs a washing processing prior to such diffusion for the semiconductor wafer, if a long time elapses after the washing processing, then the surface of the semiconductor wafer purified once by the washing is polluted again, and the diffusion processing may disadvantageously be performed in this condition. With the work supplying method of the present invention, since processing after washing of a semiconductor wafer till starting of diffusion can be performed within an acceptable time period determined therefor, no such disadvantage occurs.

In summary, the work supplying method and the work supplying apparatus of the present invention are improved or characterized in that, even if a batch can be formed only from those works prepared for the batch process apparatus, other works which are prepared for a preceding step such as a step of the pre-batch process apparatus are designated as an object of batch formation, and consequently are advantageous in that processing for different works is performed in a preferential order and delivery dates for the works can be observed strictly. This is because, when a batch is to be formed, a prior batch formation number is not utilized, but works to be formed into a batch are determined in a descending order of the preferential degree after all of those lots which can be formed into a batch are extracted.

The work supplying method and the work supplying apparatus of the present invention are improved also in that it is taken into consideration whether or not there is a time limitation after processing is performed by the pre-batch process apparatus until processing by the batch process apparatus is started. The method is advantageous in prevention of production of an unacceptable product and suppression of production disturbances, such as re-construction, can be achieved and planned production can be realized. The reason is that a work with which a time limitation is produced if processing for it is performed by the pre-batch process apparatus is not processed solely by the pre-batch process apparatus but is performed in response to a request from the batch process apparatus.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
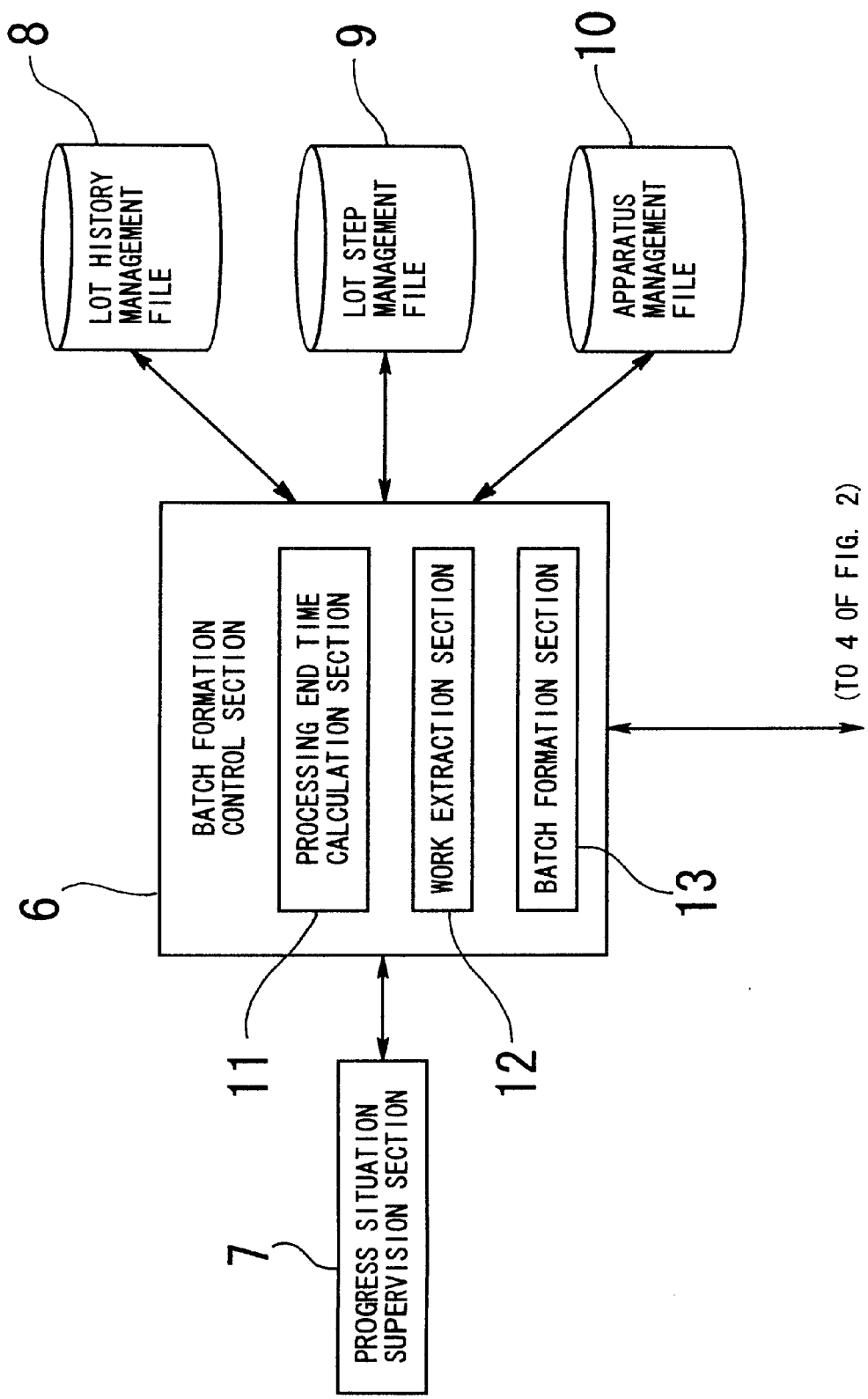
FIG. 1 is a block diagram showing a control system for a supplying apparatus to which the present invention is applied.
Figure 2:
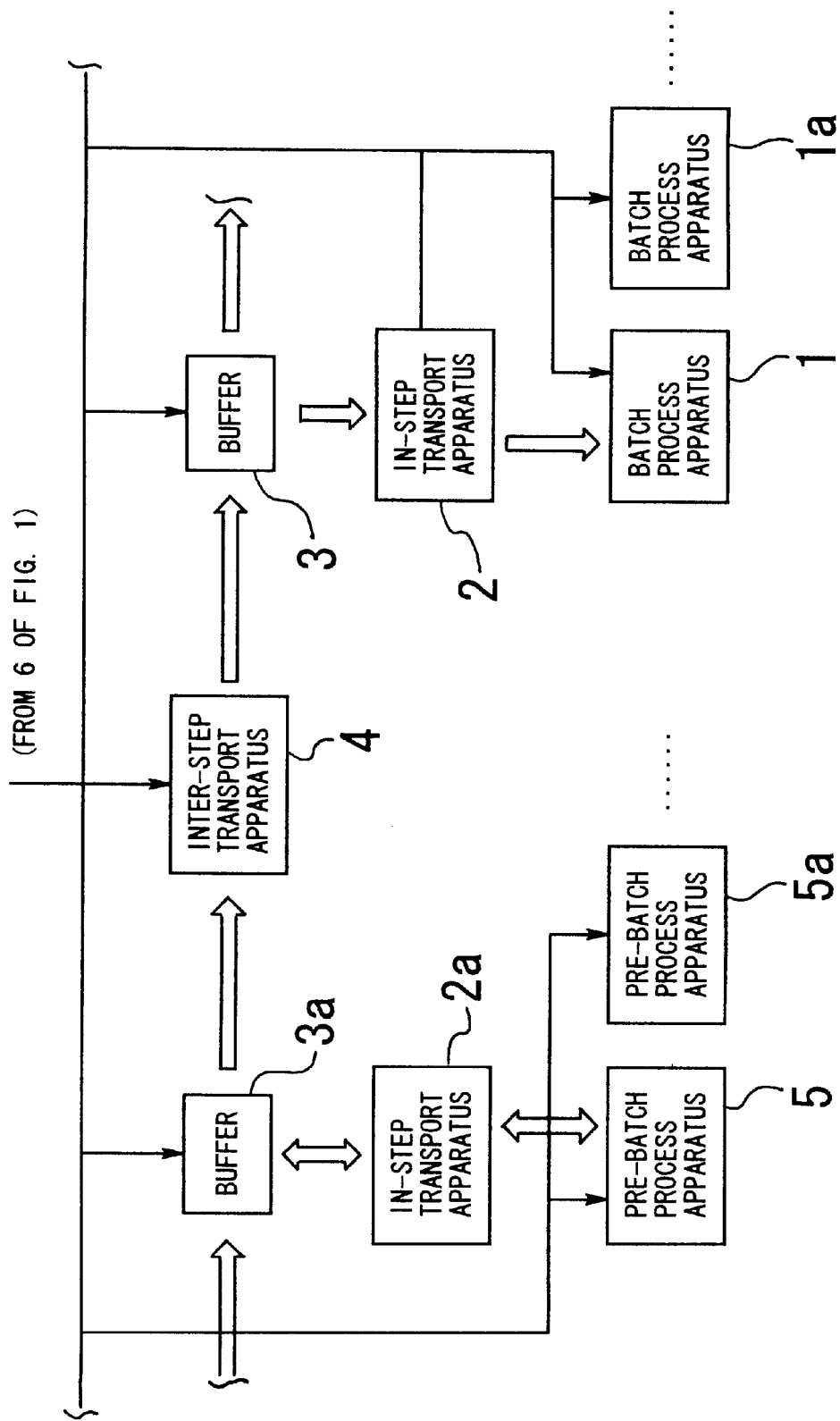
FIG. 2 is a block diagram showing a transport system and a processing system controlled by the control system of FIG. 1.

FIGS. 1 and 2 show a supplying apparatus to which the present invention is applied, and particularly, FIG. 1 shows a control system of the supplying apparatus and FIG. 2 shows a transport system and a processing system controlled by the control system of FIG. 1. It is to be noted that, in FIGS. 1 and 2, each of solid line arrow marks indicates a flow of information while each of blank arrow marks indicates a flow of a lot.

Referring first to FIG. 2, each of a plurality of batch process apparatus 1 and 1a is constructed so as to simultaneously process a plurality of sets each including a plurality of semiconductor wafers (not shown) as works. Prior to batch processing by the batch process apparatus 1 and 1a, semiconductor wafers are subject to pre-processing by a plurality of pre-batch process apparatus 5 and 5a. Between those apparatus, semiconductor wafers are transported by a plurality of in-step transport apparatus 2 and 2a, an interstep transport apparatus 4 and a plurality of buffers 3 and 3a. A plurality of semiconductor wafers are accommodated in each carrier not shown and transported in units of a lot.

Referring now to FIG. 1, the control system shown includes a batch formation control section 6, a progress situation supervision section 7, a lot history management file 8, a lot step management file 9 and an apparatus management file 10. The batch formation control section 6 includes a processing end time calculation section 11, a work extraction section 12 and a batch formation section 13. The processing end time calculation section 11 refers to the lot history management file 8 in response to a start report from the batch process apparatus 1 or 1a and predicts a processing end time of the batch process apparatus 1 or 1a from past records of the lot history management file 8. The work extraction section 12 extracts, based on the lot step management file 9, a lot or lots which can arrive at and be processed by the batch process apparatus 1 or 1a before the predicted processing end time comes. It is to be noted that also the time required for each lot to arrive at a batch process apparatus is detected from past results by the work extraction section 12 referring to the lot history management file 8 and the lot step management file 9.

Then, the batch formation section 13 of the batch formation control section 6 determines all of the thus extracted lots as an object of batch formation, puts one of the lots which has the highest preferential degree and one or more lots which can be processed together with the one lot in order and forms the lots thus put in order into a temporary batch. Then, the batch formation section 13 determines from the progress situation supervision section 7 a maximum allowable time for processing for the batch, and if a sufficient time is available, then a lot or lots which can arrive at and be processed by the batch process apparatus 1 or 1a are extracted again by the work extraction section 12. Thereafter, addition to and replacement of the members of the lots first produced is performed to decide batch formation lots.

Thereafter, the batch formation control section 6 refers to the lot step management file 9 and the apparatus management file 10 to detect whether or not the thus decided batch formation lots include a lot for which processing must be performed by a batch process apparatus within a fixed time after the processing by the pre-batch process apparatus 5 or 5a, and if such lot is present, a processing starting instruction for the lot is developed. The lots formed into the batch are collected to the buffer 3, and then supplied to the batch process apparatus 1 or 1a simultaneously when processing is completed by the batch process apparatus 1 or 1a.

Figure 3:
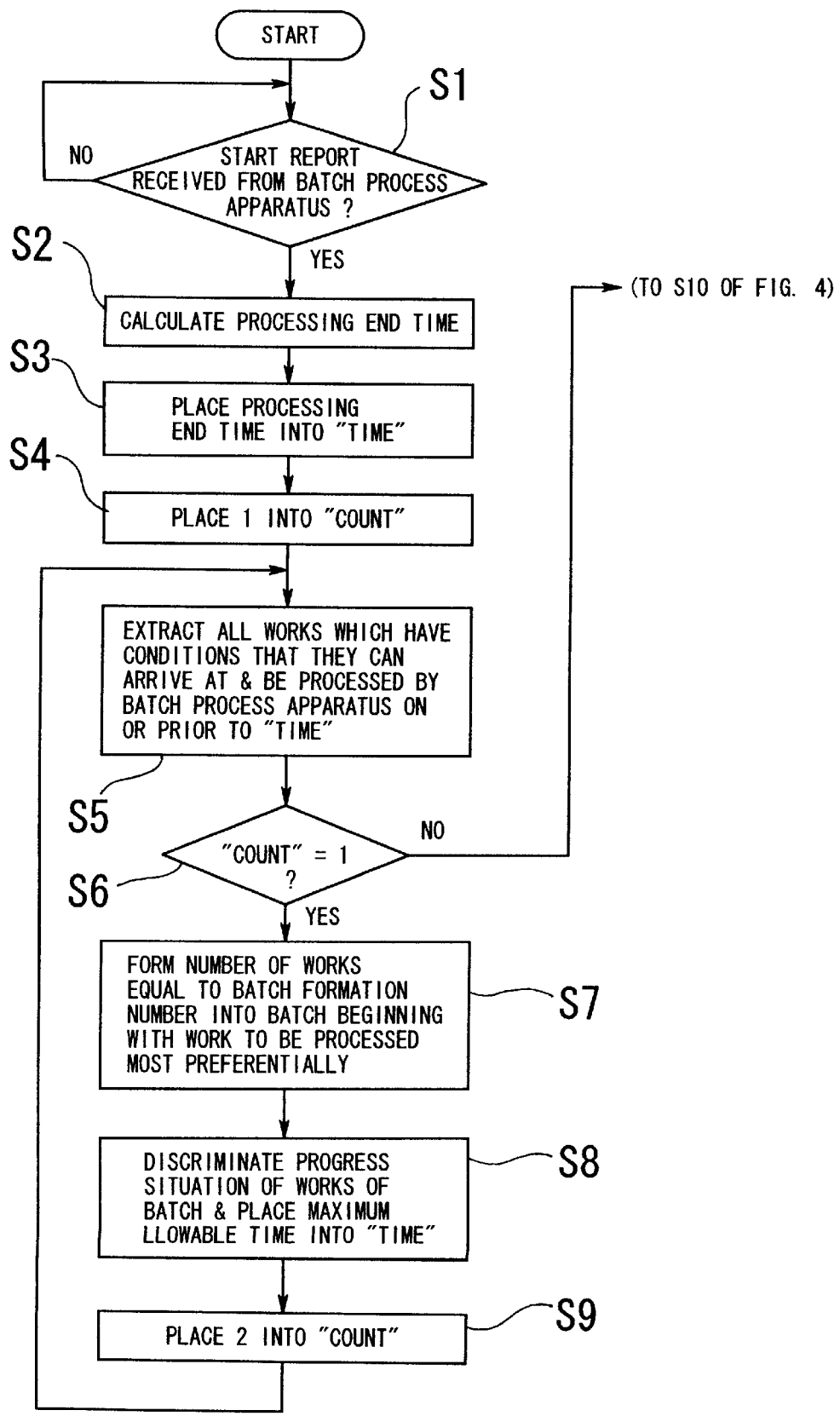
FIGS. 3 and 4 are flow chart illustrating operation principally of a batch formation control section of the supplying apparatus of FIG. 1.
Figure 4:
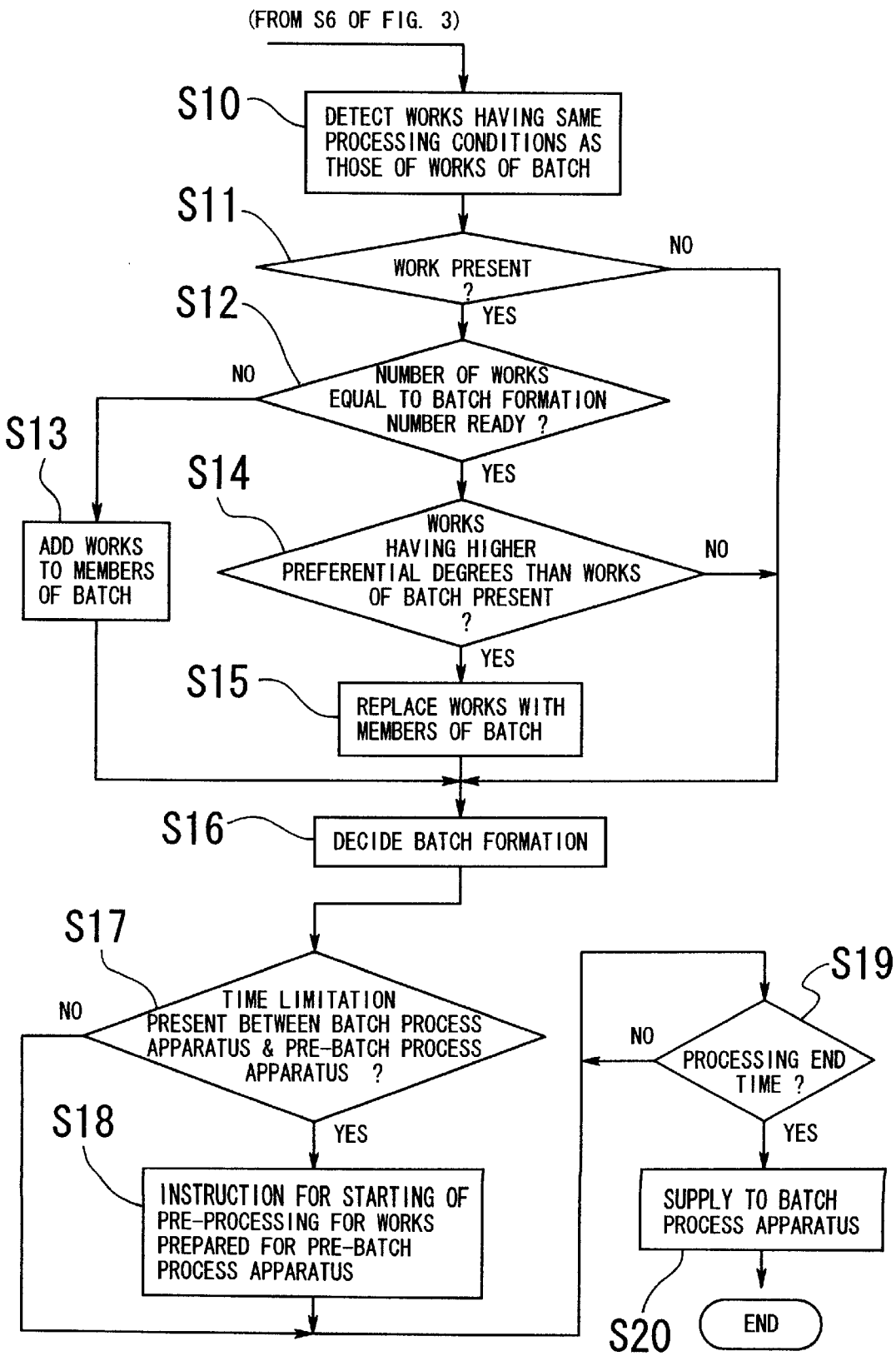

Subsequently, a batch supplying procedure according to the present invention will be described with reference to the flow charts shown in FIGS. 3 and 4. It is to be noted that, in FIGS. 3 and 4, each solid line arrow mark indicates a flow of information.

First, the batch process apparatus 1 or 1a notifies a processing start report to the batch formation control section 6 when it starts its processing (step S1). In response to the processing start report, the processing end time calculation section 11 of the batch formation control section 6 refers to the lot history management file 8 to determine a time required for batch processing from past results of the lot history management file 8 (step S2) and places a resulting processing end time into a TIME variable (step S3). Further, the processing end time calculation section 11 places "1" into a COUNT variable (step S4). Thereafter, the work extraction section 12 of the batch formation control section 6 extracts those lots which can arrive at and be processed by the batch process apparatus 1 on or prior to the determined processing end time from among all of lots present not only in the buffer 3, inter-step transport apparatus 4, buffer 3a, in-step transport apparatus 2a and pre-batch process apparatus 5 and 5a but also in all other production apparatus based on the lot step management file 9 (step S5). It is to be noted that times required for individual lots to arrive at the batch process apparatus 1 are determined by the batch formation control section 6 referring to the lot history management file 8 and the lot step management file 9 and adding, from past results of them, processing times and preparation times required by the pre-batch process apparatus 5 and 5a and the other production apparatus and transportation times required for transportation, and from the times thus determined, it is determined whether or not the lots can arrive on or prior to the processing end time. Further, it is determined by referring to the lot step management file 9 whether or not processing is possible.

Thereafter, the batch formation section 13 of the batch formation control section 6, after designating all of the thus extracted lots as an object of batch formation, selects a lot which has the highest preferential degree and a lot or lots which can be processed together with the preferential lot in order to form a temporary batch (steps S8 and S7). Then, the batch formation section 13 accesses the progress situation supervision section 7 for a maximum allowable time required for processing for the temporary batch and places a reply to the inquiry into the TIME variable (step S8), and places "2" into the COUNT variable (step S9). If a sufficient time is available, then one or more lots which can arrive at and be processed by the batch process apparatus 1 are extracted by the work extraction section 12 (step S5), and those lots characterized in that they can be processed together with the lots of the temporary batch are detected from among the thus extracted lots (step S10).

If such lots which can be processed together are detected (step S11), then if the number of the lots of the temporary batch is smaller than the batch formation number of the batch process apparatus 1, the newly found out lots are added to the lots of the temporary batch and a new batch is formed from the resulting lots (from step S12 to step S16 via step S13).

On the other hand, if the lots of the temporary batch satisfy the batch formation number of the batch process apparatus 1 or 1a, then if some lots have a higher preferential degree or degrees than the lots of the temporary batch, they are replaced with those lots which have lower preferential degrees to re-form a new batch (from step S12 to step S16 via steps S14 and S15).

If a lot which can be processed together is not detected in step S10, then a batch is determined only from the lots of the temporary batch (step S11 or S16). Or, if a lot or lots which can be processed together are detected but have lower preferential degrees or the number of lots of the temporary batch satisfies the batch formation number, then a batch is formed only from the lots of the temporary batch similarly (from step S11 to step S16 via steps S12 and S14).

Then, the batch formation control section 6 refers to the lot step management file 9 and the apparatus management file 10 to detect whether or not the lots of the thus formed batch (step S16) include a lot for which processing must be performed by the batch process apparatus 1 or 1a within a fixed interval of time after pre-processing by the pre-batch process apparatus 5 or 5a is completed. If such lot is detected, then the batch formation control section 6 instructs the in-step transport apparatus 2a and the pre-batch process apparatus 5 or 5a so that the lot may be processed within the fixed interval of time by the batch process apparatus 1 or 1a (from step S17 to step S18).

The lots determined to form a batch are collected to the buffer 3 and then supplied to the batch process apparatus 1 or 1a simultaneously when an end time for one cycle processing of the batch process apparatus 1 or 1a occurs (from step S19 to step S20).

Having now fully described the invention, it will be apparent to one of ordinary skill in the art that many changes and modifications can be made thereto without departing from the spirit and scope of the invention as set forth herein.

What is claimed is:

1. A work supplying method to a batch apparatus for semiconductor wafers for forming a plurality of works prepared for processing by said batch process apparatus and a pre-batch process apparatus into a batch and supplying the works of the batch collectively to said batch process apparatus, comprising the steps of:

predicting a processing end time in response to a processing start report from said batch process apparatus;

designating those of the works which satisfy a condition that the works can arrive at said batch process apparatus on or prior to the predicted processing end time and can be processed by said batch process apparatus as an object of batch formation;

forming the designated works into a temporary batch such that one of the works which has the highest priority among the works is positioned at the top of the batch followed by other work which can be processed together with the highest priority work;

determining a maximum allowable time for processing said temporary batch;

if the number of works in the temporary batch is smaller than a batch formation number indicative of the number of works which may be processed at one time by said batch processing apparatus, adding additional works to said temporary batch said additional works arriving at and being processed by said batch processing apparatus during said maximum allowable time;

if the number of works in the temporary batch is equal to the batch formation number, then replacing works in said temporary batch with alternate works having a higher priority than works in said temporary batch, said alternate works arriving at and being processed by said batch processing apparatus during said maximum allowable time; and supplying all of the works formed into said temporary batch to said batch process apparatus simultaneously when processing for one cycle of said batch process apparatus comes to an end.

2. A work supplying method to a batch process apparatus for semiconductor wafers as claimed in claim 1, wherein the prediction of a processing end time is performed by referring to a file in which past results are stored.

3. A work supplying method to a batch process apparatus for semiconductor wafers as claimed in claim 1, wherein, if there is a time limitation to a time interval after a time at which processing of works by said pre-batch process apparatus comes to an end till another time at which processing of the works by said batch process apparatus is started, transport means and said pre-batch process apparatus are controlled so that processing by said pre-batch process apparatus is started for works prepared for said pre-batch process apparatus in response to a request from said batch process apparatus.

4. A work supplying apparatus to a batch process apparatus for semiconductor wafers for forming a plurality of works prepared for processing by said batch process apparatus and a pre-batch apparatus into a batch and supplying the works of the batch collectively to said batch process apparatus, comprising:

processing end time calculation means responsive to a processing start report from said batch process apparatus and to a history file for predicting a processing end time;

work extraction means responsive to a step management file to extract those of the works which can arrive at said batch process apparatus on or prior to the processing end time predicted by said processing end time calculation means;

batch formation means for forming the works into a temporary batch such that one of the works which has the highest preferential degree is designated as a top work of the batch; and transport means for transporting the works formed into a batch by said batch formation means collectively to said batch process apparatus wherein said apparatus further comprises progress situation supervision means for supervising a progress situation, and wherein said batch formation means first forms a temporarily batch and then accesses said progress situation supervision means to determine a maximum allowable time required for processing of the temporary batch, and if the number of works in the temporary batch is smaller than a batch formation number indicative of the number of works which may be processed at one time by said batch processing apparatus, adding additional works to said temporary batch, said additional works arriving at and being processed by said batch processing apparatus during said maximum allowable time; and if the number of works in the temporary batch is equal to the batch formation number, then replacing works in said temporary batch with alternate works having a higher preferential degree than works in said temporary batch, said alternate works arriving at and being processed by said batch processing apparatus during said maximum allowable time.

\* \* \* \* \*